United States Patent [19]
Harrison

[11] 3,907,073
[45] Sept. 23, 1975

[54] MULTI-PLATE DISC BRAKES FOR VEHICLES

[75] Inventor: Anthony William Harrison, Birmingham, England

[73] Assignee: Girling Limited, Birmingham, England

[22] Filed: Oct. 5, 1973

[21] Appl. No.: 403,984

[30] Foreign Application Priority Data
Oct. 12, 1972 United Kingdom............... 47006/72

[52] U.S. Cl. ............. 188/71.2; 188/71.6; 188/72.4; 188/264 E; 188/264 P; 188/366; 192/113 B
[51] Int. Cl............................................ F16d 55/02
[58] Field of Search ... 188/71.6, 366, 264 P, 264 E, 188/71.2, 72.4; 192/113 B

[56] References Cited
UNITED STATES PATENTS

| | | | |
|---|---|---|---|
| 2,968,369 | 1/1961 | Parrett............................. | 188/71.2 |
| 2,971,611 | 2/1961 | Gage................................ | 188/264 P |
| 3,061,048 | 10/1962 | Alsobrooks et al. ............ | 188/264 P |
| 3,081,842 | 3/1963 | Zindler et al.................... | 188/264 E |
| 3,303,911 | 2/1967 | Hause et al...................... | 188/264 P |
| 3,552,534 | 1/1971 | Kern................................ | 192/113 B |
| 3,730,301 | 5/1973 | Heck et al. ..................... | 188/71.6 |
| 3,791,498 | 2/1974 | Wassermann ................... | 188/264 P |

Primary Examiner—Trygve M. Blix
Assistant Examiner—Edward R. Kazenske
Attorney, Agent, or Firm—Scrivener Parker Scrivener and Clarke

[57] ABSTRACT

In a multi-plate disc brake a pump assembly is located within the housing of the brake and comprises first and second pump members which are relatively rotatable, at least when the brake is applied, and each pump member is provided with a passage defining a path for liquid flow through that member in a radial direction. The arrangement is such that when the pump members are rotating relatively to each other, liquid is circulated through the housing and over the braking members in a generally radial direction.

20 Claims, 3 Drawing Figures

FIG.1.

RESERVOIR FOR LIQUID

MULTI-PLATE DISC BRAKES FOR VEHICLES

This invention relates to a new or improved multi-plate disc brake for vehicles of the kind comprising stationary and rotatable friction braking members located in a common housing and engageable to apply the brake in which pump means are incorporated for circulating liquid through the housing to cool the braking members when the brake is applied.

In one known brake of the kind set forth the pump means comprises a pump of the positive displacement type which is located outside the housing and which is driven by one of the rotatable friction braking members, when the brake is applied.

According to our invention in a multi-plate disc brake of the kind set forth for vehicles the pump means is located within the housing and comprises first and second pump members which are relatively rotatable, at least when the brake is applied, and each pump member is provided with passage means defining a path for liquid flow through that member in a radial direction, the arrangement being such that when the pump members are rotating relatively to each other, liquid is circulated through the housing and over the braking members in a generally radial direction.

The braking members are preferably disposed between all the pump members thereby providing a compact assembly.

Our pump means produces a large liquid flow at a high rate so that heat is removed rapidly. Incorporating the pump means within the housing conserves space and facilitates operation of the brake.

One of the pump members is floatingly mounted within the housing and the other pump member is keyed or otherwise coupled to the housing against rotation relative thereto.

When the housing is stationary the floating member is driven by frictional engagement with the rotatable braking members when the brake is applied.

When the housing is rotatable, the floating member normally rotates with the other pump member but is frictionally engaged with the stationary braking members when the brake is applied.

The rotational speed of the pump means is thus dependent upon the input torque from the rotatable and stationary members. This has the effect of causing slippage to occur between the floating member and the braking members whereby a constant pump output flow occurs at high brake rotational speeds, but the output flow decreases after the rotational speed has decreased to a predetermined value, conveniently equal to the speed of rotation of a member to be braked, for example a wheel or axle.

When the brake is applied and the floating member is either driven or is held against rotation, a differential centrifugal head is created causing fluid to be forced radially outwardly over the braking members. Normally, in an inoperative position of brake, the centrifugal head produced between the pump members keyed to the housing and the braking members is balanced by the centrifugal head produced by the floating member so that any resultant flow of liquid is substantially zero or small.

The passage means in the pump members interconnect inner and outer peripheral edges thereof. The passage means may comprise radial passages contained wholly within the effective axial thickness of each member. Preferably, however, the passage means in the pump member keyed to the housing and comprising stationary or rotatable braking members is bounded on at least one side by the braking member with which the pump member is adapted to engage frictionally when the brake is applied to apply liquid directly to the heated braking faces.

At least when the housing is stationary a clutch device may be incorporated between the rotatable part to be braked and the brake so that all parts of the brake and pump means are stationary when the brake is in its inoperative position.

The housing is provided with inlet and outlet ports by means of which the housing is connected to a reservoir for liquid, which conveniently acts as a heat exchanger or cooler for the heated liquid which is pumped and circulated therethrough.

Preferably each rotatable friction braking member comprises inner and outer annular portions which are coupled at adjacent peripheral edges by torque transmitting means constructed and arranged to permit relative movement between the portions to take place in radial and axial directions to compensate for distortion of the friction members when heated.

In one construction the torque transmitting means comprises interengaging circumferentially extending radial teeth provided in the adjacent mating peripheral edges.

When each braking member comprises inner and outer annular portions and the floating member is disposed between an adjacent pair of braking members, the floating member may also comprise inner and outer annular portions which are coupled at adjacent peripheral edges in a similar manner to that of the braking members.

A brake applying force is applied to the inner and outer annular portions through load proportioning means which may be constructed and arranged such that equal loads are applied to both portions of each friction braking member.

Conveniently the brake applying force is applied to both portions of each friction braking member by separate thrust applying parts of an annular member which is torsionally resilient.

The annular member may comprise an annular piston working in an hydraulic bore or it may comprise an annular member which is torsionally resilient, for example an annular thrust ring housed within a complementary recess.

Friction material carried by the braking members keyed to the housing and comprising the said other pump member may be in the form of circumferentially spaced portions of generally segmental outline which are secured to opposite faces of the friction members, or which comprise blocks of friction material received in complementary shaped apertures in the members which comprise metal plates. The gaps between adjacent portions or blocks of friction material may define the passage means in the said other pump member.

Some embodiments of our invention are illustrated in the accompanying drawings in which.

Figure 1:
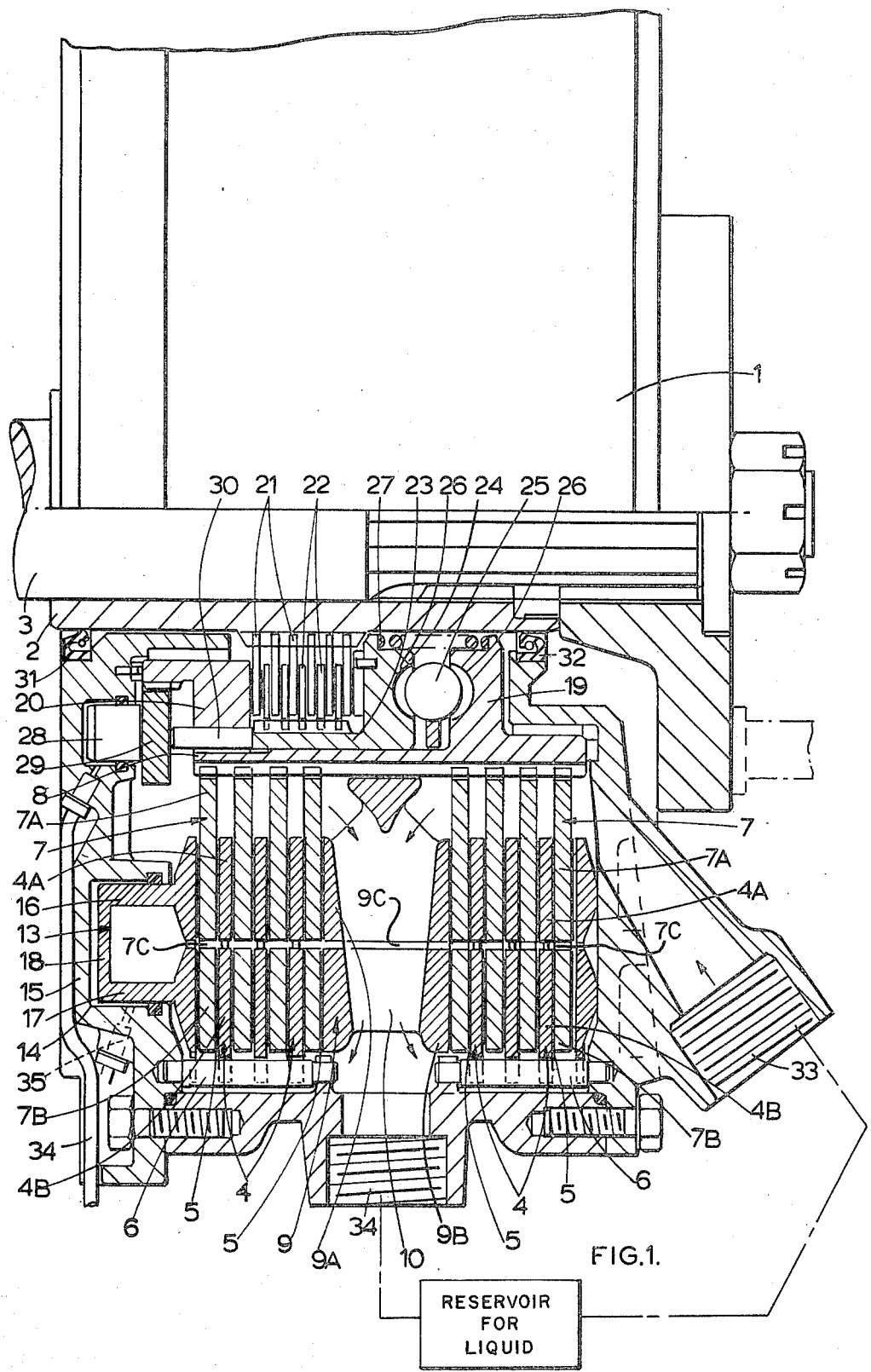
FIG. 1 is a longitudinal half section through a disc brake of the multi-plate type for a railway vehicle.
Figure 2:
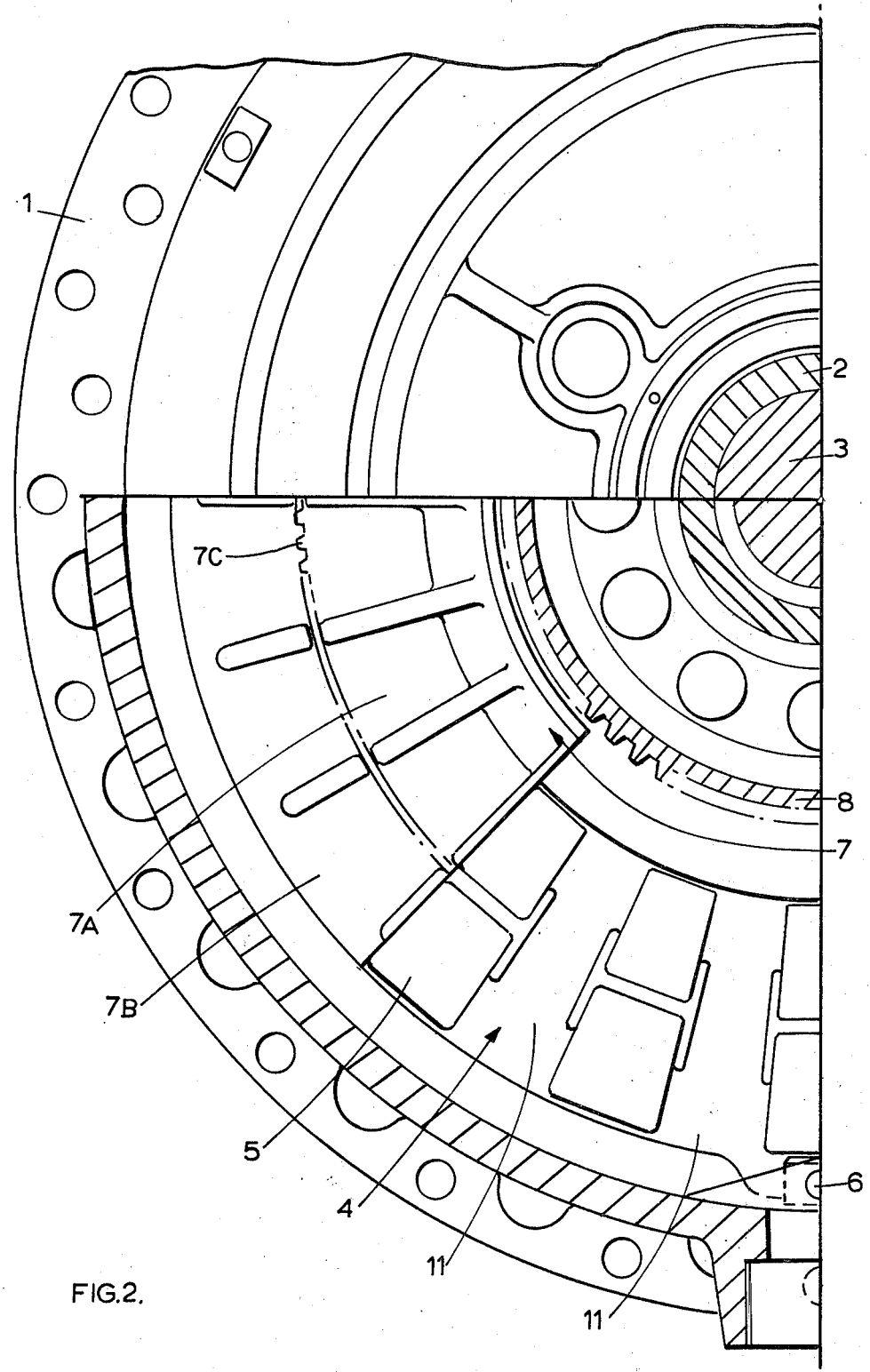
FIG. 2 is a transverse section through the brake illustrated in FIG. 1.

The multi-plate disc brake illustrated in FIGS. 1 and 2 comprises a stationary cylindrical housing 1 which is closed at opposite ends and through which projects a sleeve 2 splined to a rotatable shaft or axle 3. A plurality of friction members in the form of annular plates 4 provided on opposite sides with linings or pads 5 of friction material are guided at their outer peripheral edges for axial sliding movement on angularly spaced torque taking pins 6. The friction pads 5 may be secured to opposite faces of the plates 4 but preferably comprise blocks of friction material received in apertures in the plates.

Each plate 7 of two further sets located between adjacent pairs of plates 4 comprises an annular ring which extends outwardly from central splined sleeve 8 on which the plates 7 are guided for relative axial movement.

A floating annular ring 9 of substantial thickness forming a centrifugal pump member surrounds the sleeve 8 and is interposed between the innermost plate 7 of each further set. The ring comprises a pump impeller and is provided with passageways 10 connecting the inner and outer peripheral edges thereof. Radial passages 11 are defined between the faces of adjacent pads 5 secured to the plate 4 and are bounded on open outer sides by the adjacent plates 7. The passages 11 provide communication between the inner and outer peripheral edges of the plates 4.

The plates 4 and 7 and the impeller 9 are adapted to be clamped together and against one end wall of the housing by operation of an annular piston 13 working in an annular bore 14 in the opposite end wall 15 of the housing.

As illustrated the piston 13 comprises inner and outer radially spaced load proportioning thrust limbs 16 and 17 connected by a bridge piece 18 which is resiliently deflectable. The plates 4 and 7 and the impeller 9 each comprises inner and outer portions 4a, 4b; 7a, 7b; and 9a, 9b respectively which are splined by teeth 7c, 9c or otherwise coupled together for relative movement at least axially to compensate for thermal distortion. Each thrust limb 16 and 17 acts on one of the separate portions and, due to the resiliently deflectable bridge piece, equal loads can be applied to the portions irrespective of thermal distortion.

The sleeve 8 is provided with a pair of spaced radial projections 19, 20 which extend inwardly towards the sleeve 2. A plurality of annular braking plates 21 guided to slide on splines on the outer face of the sleeve 2 are adapted to engage frictionally with a complementary set of plates 22 guided to slide on splines on a hub member 23 disposed adjacent to and inwardly of the sleeve 8 and having a projection 24 extending towards the sleeve 2 and spaced from the projection 19. Angularly spaced balls 25 located between the projections 19 and 24 are adapted to be received in recesses 26 in adjacent faces of the projections 8 and 24 which are urged apart by a compression spring 27 to urge the plates 21 and 22 into engagement.

When the brake is in an inoperative position the plates 21 and 22 are held out of engagement by means of three angularly spaced pistons 28 acting on the hub member 23 through an annular thrust plate 29 and push-rods 30.

Seals 31 and 32 are located between the end walls of the housing and the sleeve 2 to ensure that the housing is fluid-tight.

The housing 1 is filled with liquid preferably a liquid of the oil-emulsion coolant type which is introduced from a reservoir through an inlet connection 33. Thus all four sets of plates 4, 7, 21 and 22 are immersed in oil. A radial outlet port 34 in the curved wall of the housing opposite the impeller 9 is connected to the reservoir.

When the brake is in an inoperative position the plates 21 and 22 are held out of engagement against the force in the spring 27 by means of hydraulic pressure applied to the pistons 28. In this position the sleeve 8 and the hub member 23 are stationary.

When the brake is applied, initially the supply of hydraulic fluid to the pistons 28 is cut-off. The compression spring 27 is then operative to urge the hub member 23 axially to engage the plates 21 and 22. This causes the hub member 23 to rotate with the sleeve 2 and the shaft 3 and relative to the sleeve 8. Upon relative rotation between the projections 19 and 24 the balls 25 ride out of their recesses 26 and up ramps defined by inclined sides of the recesses to lock together the hub member 23 and the sleeve 8 which then rotates with the shaft 2 taking with it the plates 7.

When the plates 7 are rotating with the shaft 3 through a clutch defined by the engagement of the balls 25 with the projections 19 and 24, hydraulic fluid under pressure is then applied to the annular piston 13 which clamps together the rotating plates 7, the stationary plates 4 and the impeller 9. The impeller 9 is driven with the plates 7 to define a centrifugal pump inducing a flow of liquid radially through the impeller 9 and radially inwards through the return passages 11. The liquid is drawn from the reservoir into the housing 1 from whence it is returned to the reservoir through the outlet port 34.

In the embodiment described above an orifice or valve is incorporated within hydraulic lines 34 and 35 to the pistons 28 and 13 respectively to ensure that the piston 13 cannot be operated until pressure has first been released from the pistons 28.

Since the impeller 9 and the plates 7 remain stationary until the brake is applied, no liquid flow, and as a consequence no generation of centrifugal head, can occur in the inoperative position of the brake.

When the brake is applied and adjacent plates 7 are clamped against opposite faces of the impeller 9, initially a substantial liquid flow rate occurs to counteract the instantaneous heat generation due to frictional engagement between the plates 4 and 7.

In a modification of the brake described above the seals 31 and 32 can be re-positioned so that the plates 21 and 22 and the clutch are isolated from the interior of the housing 1. In this way the plates 21 and 22 and the clutch are no longer immersed in liquid and furthermore the life of the seals 31 and 32 will be increased because they become stationary.

In a further construction the clutch may comprise the interengagement between complementary plane inclined faces on the projections 19 and 24 on the sleeve 8 and the hub member 23 respectively.

In a modified construction (not shown) the brake applying force is applied to the outermost plates 4 by means of opposed pistons working in hydraulic cylinders in the end walls of the housing 1. In such a construction the impeller 9 may comprise a one-piece member.

In yet another embodiment a pair of centrifugal pump members are disposed between pairs or sets of stationary and rotatable friction braking members in which each set of members are clamped by a pair of opposed pistons. Conveniently, the central or inner piston for each set comprise one of a pair of oppositely acting pistons working in a common bore.

Figure 3:
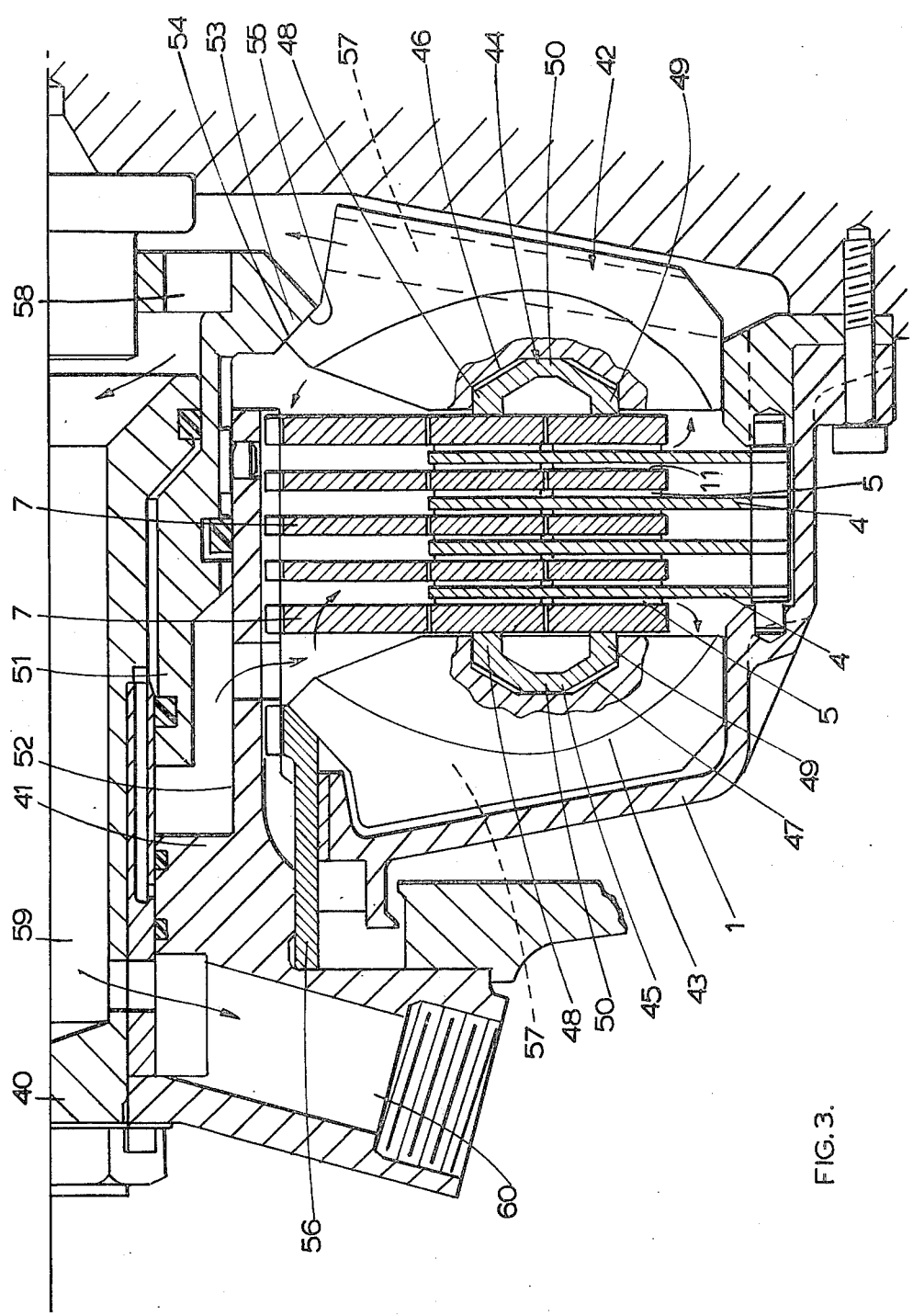
FIG. 3 is a longitudinal section through half a disc brake of the multi-plate type.

In the brake illustrated in FIG. 3 part of the housing 1 comprises a wheel of a rail vehicle in which the brake is installed.

In this construction the wheel is rotatable about a stationary member 40 and the plates 4 carrying the pads 5 of friction material rotate with the housing 1. The plates 7 are held against rotation by means of a hub 41 surrounding the axle and up on which the plates 7 are guided to slide.

A pair of annular clamp members 42 and 43 are floatingly located between the ends of the housing 1 and the outermost pair of the plates 7. The clamp members 42 and 43 act on the plates 7 through annular thrust rings 44 and 45 received in recesses 46 and 47 in the clamp members 42 and 43. Each thrust ring 44 and 45 comprises inner and outer radial thrust limbs 48 and 49 connected by bridge pieces 50 which are resiliently deflectable. Each thrust limb 48 and 49 acts on one of the articulated portions of the plates 7 so that an equal load is applied to both portions of each plate irrespective of thermal distortion.

An annular piston 51 surrounding the axis 40 and working in a cylindrical bore 52 defined by the internal surface of the hub member 41 includes at its outer end an outwardly directed projection 53 having a wedge shaped clamp face 54 for engagement with a complementary face 55 at the inner end of the clamp member 42.

Similarly, an annular reaction member 56 is adapted to engage with the inner end of the clamp member 43 in a direction opposite to the direction of engagement between the clamp face 54 and the clamp member 42.

The housing 1 is filled with liquid coolant from a reservoir through an inlet connection (not shown). The liquid is to be circulated through the passages 11 between the plates 4 and 7, and through passages 57 in the clamp members. The passage 57 in the clamp member 42 communicates with a passage 58 in the piston 51 leading into a passage 59 in the member 40 which in turn leads into a return connection 60 to the reservoir.

Normally, in an inoperative position, the plates 4 rotate with the housing and the plates 7 are stationary. Any centrifugal head created by relative movement between the plates 4 and 7 is balanced by a centrifugal head created by the floating clamp members 42 and 43 which can rotate with the wheel.

When hydraulic fluid under pressure is supplied to the piston 51, the piston is advanced to urge the clamp members 42 and 43 towards each other. This clamps the plates 4 and 7 together which, at the same time, has the effect of slowing down and applying braking loads to the clamp members 42 and 43. As this is taking place, with consequent slippage, a substantial liquid flow is induced outwardly between the plates 4 and 7 and inwardly through the passages 57 in the clamp members 42 and 43.

In the embodiment described above with reference to FIG. 3 the impeller comprises the rotating braking members 4 which act in the same manner as the impeller 9 of the embodiment of FIGS. 1 and 2.

The construction in accordance with FIG. 3 is otherwise the same as that described above with reference to FIGS. 1 and 2 and corresponding reference numerals have, where appropriate, been applied to corresponding parts.

I claim:

1. A disc brake of the multi-plate type for vehicles comprising a housing, stationary and rotatable braking members located in said housing of which one of said braking members comprises a first pump member, applying means for urging said braking members into engagement to apply the brake, and a second pump member located within said housing and defining with said first pump member pump means, each pump member provided with passage means defining a path for liquid flow through that member in a generally radial direction, at least when said brake is applied, said passage means in said pump members being constructed and arranged so that when said pump members are rotating relatively to each other, liquid is circulated through said housing and over said braking members in a generally radial direction, said second pump member being floatingly mounted within said housing and rotatable with respect to both said stationary and rotatable braking members.

2. A disc brake as claimed in claim 1, wherein said passage means in said pump members interconnect inner and outer peripheral edges thereof.

3. A disc brake as claimed in claim 1, wherein said passage means comprises radial passages contained wholly within the effective axial thickness of each pump member.

4. A disc brake as claimed in claim 1, wherein coupling means are provided for coupling said first pump member to said housing against rotation relative thereto.

5. A disc brake as claimed in claim 4, wherein said housing is stationary and said second pump member is driven by frictional engagement with said rotatable braking members when said applying means are operated to apply said brake.

6. A disc brake as claimed in claim 4, wherein said housing is rotatable and said second pump member is normally rotatable with the said rotatable braking members and is frictionally engaged with said stationary braking members when said applying means are operated to apply said brake.

7. A disc brake as claimed in claim 1, wherein said first pump member comprises a set of braking members coupled to said housing and said passage means in said braking members of said set comprise gaps between circumferentially spaced areas of friction material which are carried thereby and which engage with the other said braking members when the brake is applied.

8. A disc brake as claimed in claim 7, wherein said friction material is in the form of circumferentially spaced portions of generally segmental outline which are secured to opposite faces of each said braking member.

9. A disc brake as claimed in claim 7, wherein said friction material comprises blocks received in complementary shaped apertures in each said braking member.

10. A disc brake as claimed in claim 1, wherein each braking member comprises inner and outer annular portions and torque transmitting means couple together adjacent peripheral edges of said inner and outer annular portions, said torque transmitting means being constructed and arranged to permit relative movement to take place in radial and axial directions to compensate for distortion of said braking members when heated.

11. A disc brake as claimed in claim 10, wherein said applying means includes load proportioning means which act on said inner and outer annular portions.

12. A disc brake as claimed in claim 11, wherein said load proportioning means comprises a torsionally resilient annular member having separate thrust applying parts acting on said inner and outer annular portions.

13. A disc brake as claimed in claim 12, wherein said annular member comprises an annular piston working in an hydraulic bore.

14. A disc brake as claimed in claim 1, wherein said second pump member is disposed between adjacent pairs of braking members, said second pump member including inner and outer annular portions, and torque transmitting coupling means coupling together adjacent peripheral edges of said inner and outer annular portions of said second pump member.

15. A disc brake as claimed in claim 14, wherein said torque transmitting means comprises interengaging circumferentially extending teeth provided in said adjacent mating peripheral edges.

16. A disc brake of the multi-plate type for vehicles comprising a stationary housing, a part rotatable relative to said housing, rotatable braking members in said housing rotatable with said part, stationary braking members in said housing coupled to said housing and adapted to be engaged by said rotatable braking members, applying means for urging said rotatable and stationary braking members into engagement to apply said brake, and a pump impeller located in said housing between an adjacent pair of said rotatable braking members and provided with passage means defining a path for liquid flow through said impeller in a radially outwards direction when said impeller is rotating with said pair of rotatable braking members being provided with passage means defining a path for liquid flow in a generally radially inward direction when said impeller is rotating with the said pair of rotatable braking members, said passage means in each stationary braking member being coupled on one side by a face of a rotatable braking member with which said stationary braking member is adapted to engage when the brake is applied whereby liquid is applied directly to heated braking faces, and said impeller being floatingly mounted in said housing and rotatable with respect to both said stationary and rotatable braking members to balance any centrifugal hydraulic head generated between said braking members in an off position of brake.

17. A disc brake of the multi-plate type for vehicles comprising a fixed part, a rotatable housing rotatable relative to said fixed part, stationary braking members in said housing coupled to said fixed part, rotatable braking members in said housing rotatable therewith and defining a pump impeller, opposed clamp members mounted in said housing and disposed between opposite end walls of said housing and a pair of said stationary members which are outermost, and means for urging said clamp members towards each other to urge said braking members into engagement to apply said brake, said rotatable braking member being provided with passage means defining a path for liquid flow in a generally radially outward direction, and each clamp member being provided with passage means defining a path for liquid flow in a generally radially inward direction when said impeller is rotating, said passage means in each rotatable braking member being bounded on one side by a face of a stationary braking member which is adapted to engage therewith when the brake is applied whereby liquid is applied directly to heated braking faces, and said clamp members being floatingly mounted in said housing and rotatable with respect to both said stationary and rotatable braking members to balance any centrifugal hydraulic head generated between said braking members in an off position of brake.

18. A disc brake of the multi-plate type for vehicles comprising a stationary housing, a part rotatable relative to said housing, rotatable braking members in said housing rotatable with said part, clutch means for transmitting rotation of said part to said rotatable braking members, stationary braking members in said housing coupled to said housing, applying means for urging said rotatable and stationary braking members into engagement to apply said brake, and a pump impeller floatingly mounted in said housing between an adjacent pair of said rotatable braking members and provided with passage means defining a path for liquid flow through said impeller, in a generally radially outward direction when said impeller is rotating with respect to said stationary braking members, said stationary braking members being provided with passage means defining a path for liquid flow in a generally radially inward direction when said impeller is rotating, and means being incorporated for holding said clutch means in a disengaged position in which said rotatable members do not rotate with said part unless and until said applying means are operated, said passage means being so constructed and arranged that when said applying means are operated said pump impeller rotates with respect to said stationary braking members and liquid is circulated through said housing and over said braking members in a generally radial direction, and said impeller being rotatable with respect to both said stationary and rotatable braking members to balance any hydraulic head generated between said braking members in an off position of brake.

19. A disc brake as claimed in claim 18, wherein an operating spring is adapted to urge said clutch means into said engaged position, and said clutch means includes hydraulic pressure responsive means normally adapted to be subjected to hydraulic pressure to hold said clutch means in said disengaged position in opposition to the force of said operating spring, said clutch means being engaged automatically upon release of said hydraulic pressure.

20. A disc brake as claimed in claim 1, wherein said housing is provided with inlet and outlet ports by means of which said housing is connected to a reservoir for liquid which acts as a heat exchanger for heated liquid which is pumped and circulated therethrough.

* * * * *